US011373057B2

(12) United States Patent
Route et al.

(10) Patent No.: US 11,373,057 B2
(45) Date of Patent: Jun. 28, 2022

(54) ARTIFICIAL INTELLIGENCE DRIVEN IMAGE RETRIEVAL

(71) Applicant: Kyndryl, Inc., New York, NY (US)

(72) Inventors: Saritha Route, Bangalore (IN); Clea Anne Zolotow, Key West, FL (US); John Graham, Ryde (GB); Ana Maria Bezerra Maimoni, Sao Paulo (BR); Pedro Soares, Silveira (PT)

(73) Assignee: KYNDRYL, INC., New York, NY (US)

( * ) Notice: Subject to any disclaimer, the term of this patent is extended or adjusted under 35 U.S.C. 154(b) by 177 days.

(21) Appl. No.: 16/872,876

(22) Filed: May 12, 2020

(65) Prior Publication Data

US 2021/0357682 A1 Nov. 18, 2021

(51) Int. Cl.
| G06V 10/77 | (2022.01) |
| G06K 9/62 | (2022.01) |
| G06T 11/20 | (2006.01) |
| G06F 16/54 | (2019.01) |
| G06F 16/535 | (2019.01) |
| G06F 16/58 | (2019.01) |

(52) U.S. Cl.
CPC ......... *G06K 9/6232* (2013.01); *G06F 16/535* (2019.01); *G06F 16/54* (2019.01); *G06F 16/5866* (2019.01); *G06K 9/6259* (2013.01); *G06T 11/206* (2013.01)

(58) Field of Classification Search
CPC combination set(s) only.
See application file for complete search history.

(56) References Cited

U.S. PATENT DOCUMENTS

| 8,195,672 | B2 | 6/2012 | Monga |
| 8,676,937 | B2* | 3/2014 | Rapaport ........... H04N 21/8358 |
| | | | 709/219 |
| 8,892,554 | B2 | 11/2014 | Carmel et al. |
| 9,122,708 | B2* | 9/2015 | Barrington .............. G06F 16/29 |
| 9,128,959 | B2* | 9/2015 | Barrington ............ G06F 16/583 |
| 9,129,008 | B1* | 9/2015 | Kuznetsov ........ G06F 16/24578 |

(Continued)

FOREIGN PATENT DOCUMENTS

| CN | 107066583 A | 8/2017 |
| WO | 2013/139754 A1 | 9/2013 |

OTHER PUBLICATIONS

Mell, P. et al., "The NIST Definition of Cloud Computing" NIST Special Publication (2011) 7 pages.

(Continued)

*Primary Examiner* — Anand P Bhatnagar
(74) *Attorney, Agent, or Firm* — Tutunjian & Bietto, P.C.; Erik Swanson (57) ABSTRACT

A method for retrieving a plurality of electronic images that includes obtaining images from a plurality of electronic storage sites. A first set of images containing a main protagonist is selected from the plurality of electronic images. An intent based image selection is performed from the first set of images. The intent based image selection includes tagging the first set of images with word tags identifying content of the images, creating a word cloud from the word tags, plotting the top word tags from the word cloud in a Venn diagram, and extracting images from the overlapping are of the Venn diagram.

20 Claims, 7 Drawing Sheets

(56) References Cited

U.S. PATENT DOCUMENTS

| | | | |
|---|---|---|---|
| 10,083,186 B2* | 9/2018 | Har-Noy | G06F 16/23 |
| 10,176,194 B2* | 1/2019 | Har-Noy | G06Q 10/101 |
| 10,346,495 B2* | 7/2019 | Har-Noy | G06F 16/9537 |
| 10,878,296 B2* | 12/2020 | Murphy | G06N 3/08 |
| 10,909,425 B1* | 2/2021 | Brody | G06N 3/0454 |
| 10,956,793 B1* | 3/2021 | Wang | G06N 3/04 |
| 2008/0215984 A1 | 9/2008 | Manico et al. | |
| 2012/0290950 A1* | 11/2012 | Rapaport | H04N 21/8358 |
| | | | 715/753 |
| 2014/0078177 A1* | 3/2014 | Yamaji | G09G 5/14 |
| | | | 345/634 |
| 2014/0233863 A1* | 8/2014 | Barrington | G06F 16/29 |
| | | | 382/305 |
| 2014/0236851 A1* | 8/2014 | Barrington | G06F 16/5866 |
| | | | 705/321 |
| 2014/0344718 A1* | 11/2014 | Rapaport | H04L 51/32 |
| | | | 715/753 |
| 2015/0379047 A1* | 12/2015 | Har-Noy | G06F 16/56 |
| | | | 707/722 |
| 2016/0314127 A1* | 10/2016 | Har-Noy | G06Q 10/101 |
| 2017/0083586 A1 | 3/2017 | Huang et al. | |
| 2017/0278135 A1 | 9/2017 | Majumdar et al. | |

OTHER PUBLICATIONS

Authors et al., disclosed Anonymously, "Method for Management of Media Content Across Devices, Storage, Cloud, and Social Networks through use of Analytics" IP.com No. IPCOM000239674D (Nov. 2014) pp. 1-5.

Zeng, Z. et al., "Searching Personal Photos on the Phone with Instant Visual Query Suggestion and Joint Text-Image Hashing" Association for Computing Machinery (Oct. 2017) pp. 1-9.

* cited by examiner

FIG. 7

ARTIFICIAL INTELLIGENCE DRIVEN IMAGE RETRIEVAL

BACKGROUND

The present invention generally relates to image characterization, and more particularly to image categorization with an intent based sentiment.

Electronic images may be stored on phones, in cloud storage, in emails, as well as other communications applications. These images are often tagged or categorized and labeled. However, this is not always the case, and hence retrieving an image for a specific requirement, such as creating a collage for an event, can become cumbersome and time-consuming. For example, retrieving images from electronic storage that are not tagged or categorized requires knowledge or recall based search and retrieval. For example, a person looking for an electronically stored picture would have to know where the pictures are stored or when they were taken, who was in the frame, who shared it, and other types of information. This can be a time consuming and difficult task.

SUMMARY

In one aspect, a computer implemented method for retrieving electronic images is provided. In one embodiments, the computer implemented method for retrieving a plurality of electronic images includes obtaining images from a plurality of electronic storage sites. A first set of images containing a main protagonist is selected from the plurality of electronic images. An intent based image selection is performed from the first set of images. The intent based image selection includes tagging the first set of images with word tags identifying content of the images, creating a word cloud from the word tags, plotting the top word tags from the word cloud in a Venn diagram, and extracting images from the overlapping or intersecting areas of the Venn diagram, the extracted images providing a collage of intent based images correlated to the main protagonist.

In another aspect, a system is provided for retrieving electronic images. In one embodiment, the system includes a first interface for retrieving a plurality of electronic images includes obtaining images from a plurality of electronic storage sites. An image recognition engine for selecting a first set of images containing a main protagonist from the plurality of electronic images. An artificial intelligence chatbot performs an intent based image selection from the first set of images. The intent based image selection includes tagging the first set of images with word tags identifying content of the images, creating a word cloud from the word tags, plotting the top word tags from the word cloud in a Venn diagram, and extracting images from the overlapping are of the Venn diagram. The system further includes a report generator for producing a collage of intent based images correlated to the main protagonist from the extracted images In yet another aspect, a computer program product is provided for retrieving a plurality of electronic images that includes a computer readable storage medium having computer readable program code embodied therewith. The program instructions executable by a processor to cause the processor to obtain, using the processor, images from a plurality of electronic storage sites, and select, using the processor, a first set of images containing a main protagonist from the plurality of electronic images. The instructions further include performing, using the processor, an intent based image selection from the first set of images. The intent based image selection can include tagging the first set of images with word tags identifying content of the images, creating a word cloud from the word tags, plotting the top word tags from the word cloud in a Venn diagram, and extracting images from the overlapping are of the Venn diagram. The extracted images provide a collage of intent based images correlated to the main protagonist.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In some embodiments, the methods, systems and computer program products that are described herein provide an artificial intelligence (AI) driver image retrieval solution that applies a method that first understands the sentiment of the intended use of the image and then uses a combination of machine learning, structured data retrieval, folder search techniques and image identification to bring the specific context to aid a real-time classification and retrieval of images. The images being retrieved by the methods, systems and computer program products of the present disclosure can be retrieved from a mobile phone or similar device from across different local storage locations and cloud storage locations. As will be described herein, the intent may be the reason for the collage. For example, a user may be requesting an image retrieval for an upcoming event, such as a birthday or an anniversary.

Photographs on mobile phones are stored in multiple locations, such as on the phone's memory, the sim card, a secured digital card (SD card) and also on cloud storage from multiple providers. The stored images also have different provenance, e.g., place or original of earliest known history. The provenance may indicate that the image was taken during a specific camera, whether the image was shared over Bluetooth. The provenance may also include messaging applications that provides a platform for users to text, chat, and share media, including voice messages and video, with individuals or groups.

Prior to the methods, systems and computer program products of the present disclosure, electronics images can be manually characterized and catalogued. Pictures can be easily be categorized differently depending upon a potentially unlimited number of circumstances, and hence manual characterization is generally not applied consistently. Prior to the methods, systems and computer program products of the present disclosure, retrieving electronic images from multiple storage locations can be time consuming when considering the inconsistencies of manual characterization. It has been determined that prior solutions for image retrieval generally restrict search to selected storage devices or sets of folders on a phone, application or similar device. Repeating a search of across various different storage areas is also not optimal and can result in inconsistencies in image retrieval.

In some embodiments, the methods, systems and computer program products that are described herein can overcome the above potential difficulties that can result from manual characterization with a method by which pictures are categorized based on various factors that can be chosen in real time, and the search methods can be reproducibly applied to a plurality of storage locations automatically. In some embodiments, images are organized either based on tags or based on folders. In some embodiments, image recognition can use color, texture, facial recognition, and GPS tagging, among other methods. In some embodiments, a combination of automated image matching and recognition along with search and retrieval using and artificial intelligence (AI) and machine learning helps in finding like images and matching images. The methods, systems and computer program products of the present disclosure can leverage artificial intelligence, tagging, folder management and manually categorized images with artificial intelligence (AI) based sentiment analysis to organize photographs. This can facilitate picture selection on an ad hoc basis.

The multi-storage intent based artificial intelligence (AI) driven image retrieval solutions of the present disclosure combines image searches based on a combination of tagging, pre-defined categorization and labeling in addition to applying artificial intelligence (AI) to aid in identifying images that are fit-for-purpose, or matching an intent. The multi-storage intent based artificial intelligence (AI) driven image retrieval solutions of the present disclosure also applies machine learning (ML) for context by analyzing facial expressions, e.g., distinguishing between smiling verses frowning, in the image processing and analyzing associated environment and texts. For example, the multi-storage intent based artificial intelligence (AI) driven image retrieval solutions of the present disclosure can rapidly pick out pictures stored on the phone, or exchanged on electronic communications and social media platforms, that contain images. The methods, systems and computer program products for image retrieval are suitable for many types of search criteria. In some examples, the search criteria for the image retrieval may be a facial expression, e.g., whether a subject of the image is smiling, or the search criteria may be the positioning of a subject in an image, e.g., whether a person is in the center of a group picture with common friends and family.

In some embodiments, the methods, systems and computer program products can determine based on an event or definition, a construct or type of images that 'fit' a purpose that images can be selected to meet, and rapidly the images can be retrieved from storage locations. The solution can also take in specific recommendations of images (such as red dress, cutting cake, at location and so on) to be included as feeders to the retrieval process. In some embodiments, the text around the picture can be utilized as well, which is one differentiator from existing cloud-based photo sentiment analytic methods.

In some embodiments, the methods, systems and computer program products for image retrieval that are described herein can measure the sentiment or need for the images and can learn based on the user's historical image selection so that appropriate collages or images can be created. The multi-storage intent based artificial intelligence (AI) driven image retrieval solutions of the present disclosure that not just matches or leverages image recognition techniques, but are also able to match user's sentiment with the sentiment in the pictures to create custom images and collages. The methods, systems and computer program products of the present disclosure are now discussed with greater detail with reference to FIGS. 1-7.

Figure 1:
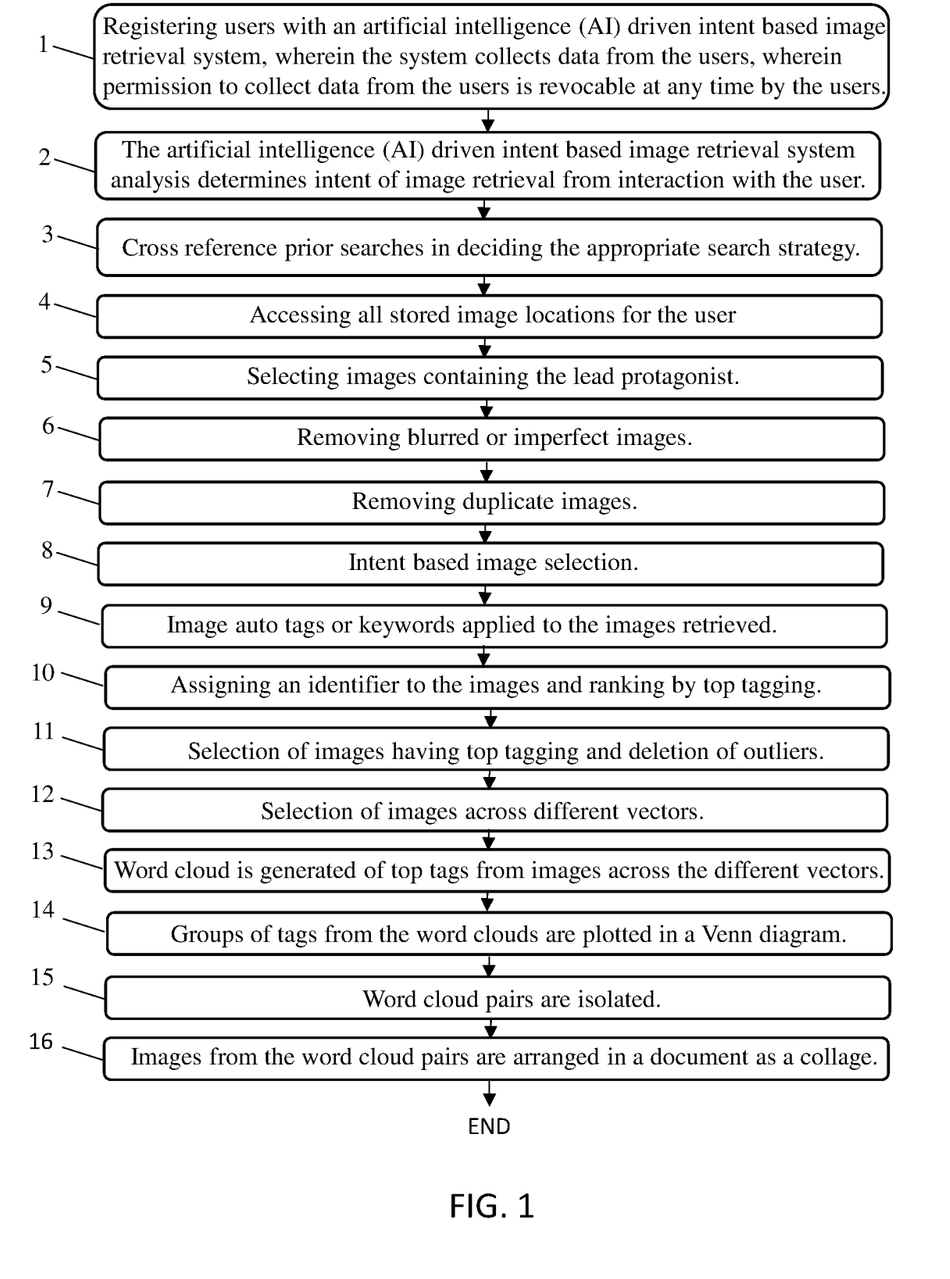
FIG. 1 is a flow diagram showing one embodiment of a method for artificial intelligence (AI) driven intent based image retrieval.
Figure 2:
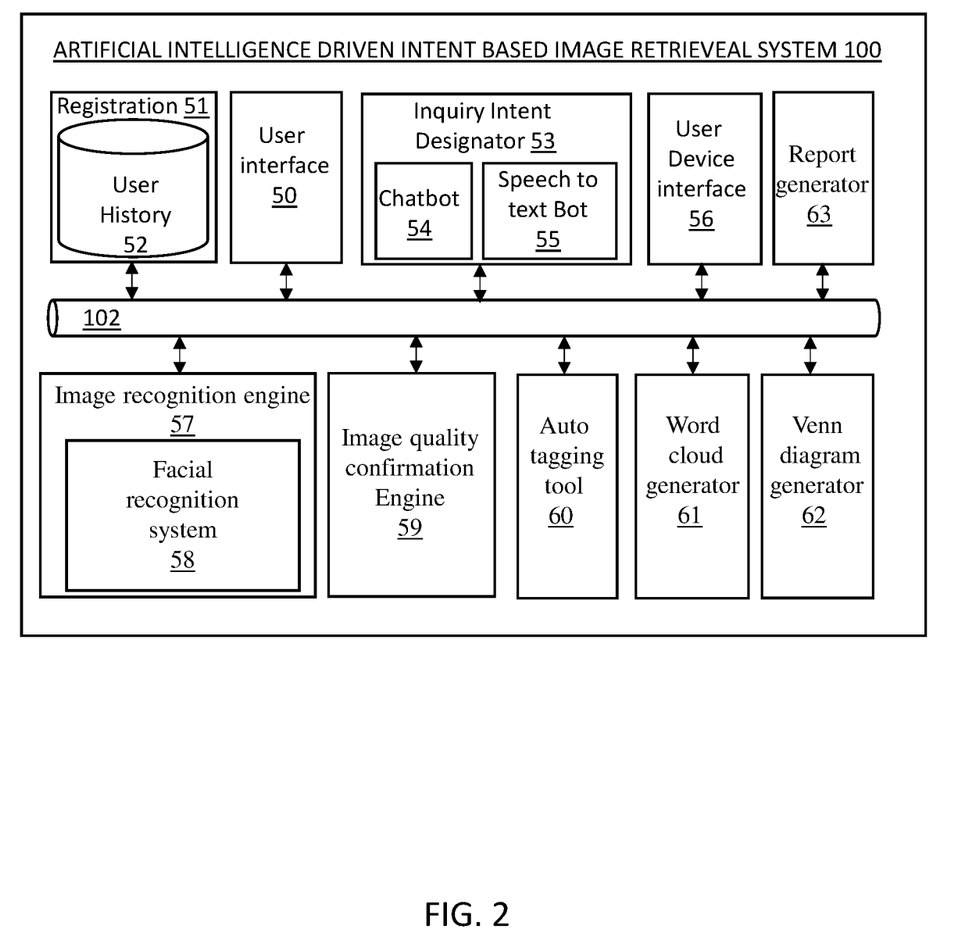
FIG. 2 is a block diagram of an artificial intelligence (AI) driven intent based system for retrieving images, in accordance with one embodiment of the present disclosure.
Figure 3:
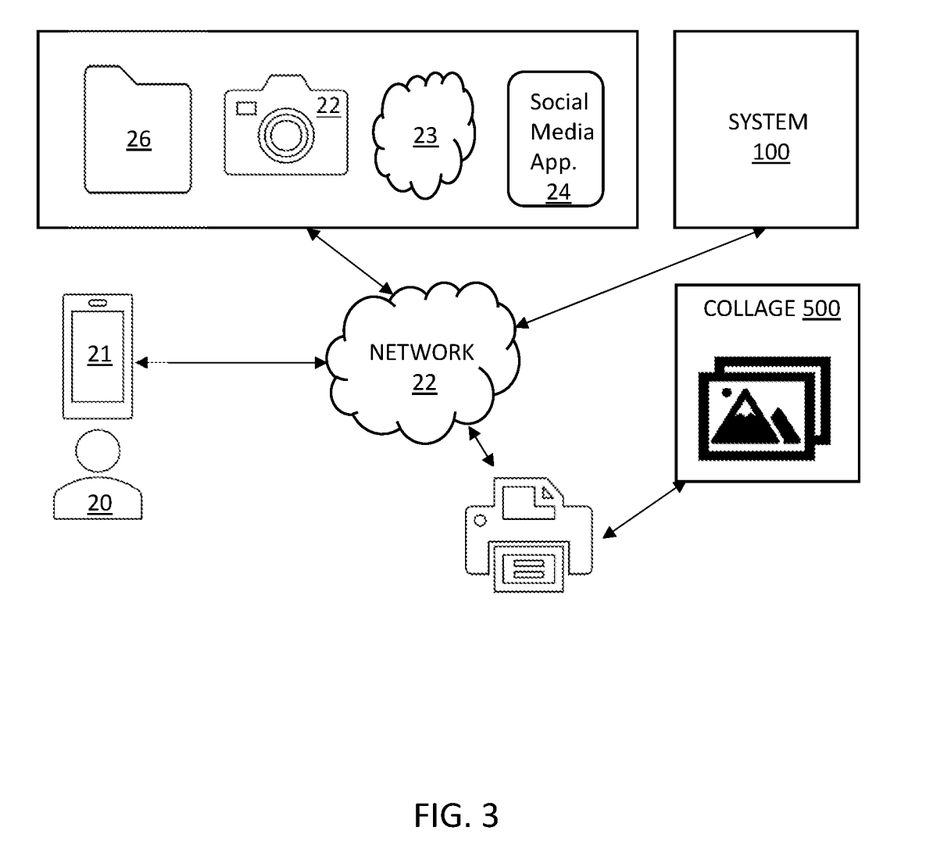
FIG. 3 is an illustration of a user interacting with an artificial intelligence (AI) driven intent based system, in which the system is retrieving images from a plurality of devices having electronically stored images, and the system is creating a document containing all the retrieved images having a shared sentiment or intent.

FIG. 1 illustrates one embodiment of a method for artificial intelligence (AI) driven intent based image retrieval. FIG. 2 is a block diagram of a system 100 for retrieving images using an artificial intelligence (AI) driven intent based system. FIG. 3 illustrates one embodiment of a user 20 retrieving images using an artificial intelligence (AI) driven intent based system 100, in which the system is retrieving images from a plurality of devices 21 having electronically stored images, and the system is creating a document 500 containing all the retrieved images, wherein the retrieved images share a same sentiment or intent. In some embodiments, the user 20 may employ the system 100 to request a collage of electronic images for a specific event, such as a birthday. In one example, the user 20 enters the event and the identity of the person that is the subject of that event into the system 100, and the system 100 provides a collage 500 of electronic images that are specific to the event and the specific to the identity of the person. The event may be the intent/sentiment for the images retrieval. It is noted that FIG. 3 illustrates only one example of an application for the methods, systems and computer program products of the present disclosure.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The present disclosure relates to down selecting images from across specified devices and locations (such as the local storage on a phone, the SIM storage, SD card and specified cloud accounts) against a specified intent of categorization. By "down selecting" it is meant that a plurality of images are characterized in increasingly relevant degrees to the intent for the retrieval. The present disclosure is aimed at rapid real-time retrieval of images based on a stated intent of use of the images. An artificial intelligence (AI) engine provides additional selection and search criteria based on the events curated plus specific context for better fit user's need. Based on the user selection, the artificial intelligence (AI) system further learns user preferences and also applies corrective action to perform an enhanced search.

FIG. 1 illustrates one embodiment of a method for artificial intelligence (AI) driven intent based image retrieval. In some embodiment, the methods and systems ranks, down selects and creates a collage of a sub set of identified images without human intervention. In some embodiments, events, actions, people and other images characteristics are used to create waveforms for the next level of sorting and ranking based on various vectors defined by image characteristics and meta tags. In one embodiment, the method may being with a user registering with the artificial intelligence (AI) driven intent based image retrieval system 100 at block 1. Referring to block 1 of FIG. 1, in one embodiment, the method for using the artificial intelligence (AI) driven intent based image retrieval system 100 can begin with registering a participant 20 (the term participant and user are interchangeable). Registration by the participant 20 to the system 100 allows the system to collect data from storage devices being used by the participant 20, such as mobile phones, sim cards, a secured digital card (SD card), and cloud storage on which the user 20 may store electronic images. Registration by the participant 20 may further include linking the system to applications being used by the participant that can be used to take, store and transfer electronic images, in which the applications may include messaging applications that lets users text, chat, and share media, including voice messages and video, with individuals or groups. The system 100 collects data from the person, e.g., participant 20, and the participant's storage devise 21, and the participant 20 can revoke permission from the system at any time.

FIG. 2 is a block diagram of an artificial intelligence (AI) driven intent based system 100 for retrieving images. The system 100 includes an interface 50 that the user 20 can connect to the system 100 through. The interface 50 may allow for the user 10 to enter information into the system through the users terminal device 21, as depicted in FIG. 3. The user's terminal device 21 may include a mobile computing device, such as a laptop, tablet computer, smart phone or specific interface device including at least one of a display and/or a data entry device, such as a keyboard, touchscreen or pointing device. The user 20 may register with the system 100 using a mobile computing device 21, in which the user's terminal device 21 can communicate over a network 22 with the system 100 through the interface 50. The network 22 may include, for example, the Internet, a local area network, a wide area network and/or a wireless network. The network 22 may comprise copper transmission cables, optical transmission fibers, wireless transmission, routers, firewalls, switches, gateway computers and/or edge servers. The interface 50 may be a transceiver.

Referring to FIG. 2, when the user registers with the system at block 1, the system 100 can save user information from the registration in a registration database 51. The registration database 51 includes one form of storage, e.g., hardware memory. For example, the hardware storage may include a hard disk, a random access memory (RAM), a read-only memory (ROM), an erasable programmable read-only memory (EPROM or Flash memory), a static random access memory (SRAM) or combination thereof. The memory for storing the registration database 51 may also be provided by cloud based memory.

The registration database 51 includes user information that is used by the system for image retrieval. In addition to identity and log in information for a user 20, the registration database 51 may include a user history database 52. The user history database 52 may include data indicating a user's prior usage of the system for image retrieval. A retrieval history of images that the user 10 previously received through the artificial intelligence (AI) driven intent based system 100 for retrieving images. The user history database 52 may include sentiment information on previously delivered images to the user 20 from the system 100 in response to a user request. The user history database 52 may continually be updated with information directed to the user's interaction with the artificial intelligence (AI) driven intent based system 100 for retrieving images.

At block 2 of the method depicted in FIG. 1, an interaction between the user 20 and the system 100 begins establishing the intent (also referred to as context) for the search of the different storage locations 21 for the retrieving images. For example, the user 20 may enter into the system a party, e.g., person identity, which the user 20 wishes that the user 20 wishes to be present in each of the images. It is not necessary that the user 20 be present in the photos. However, in some embodiments, the user 20 may identify themselves as the party that they wish to be present in each of the images. The intent for the image retrieval may also be set at block 2. The user 20 may enter the intent, as an upcoming social event, such as a party, anniversary, celebration, promotion etc. It is not necessary that the intent be a social event. The intent can be a type of activity, e.g., sport, etc.

Referring to block 2 of the method depicted in FIG. 1, the system 100 identifies the user 20 to bring some context from previous interactions with the user 20. In some embodiments, when the user 20 interacts with the system 100, e.g., the user 20 logs into the system, the system 100 may identify the user 20 by name and the images (previous collections/collage of images 500) that have been previously retrieved for the user 20. The name and prior image retrievals for the user 20 may be shared as the lead protagonist. As noted above, it is not necessary that the user 20 be the identity for the people that are present in the images being retrieved be the user 20, however it is an option for the methods, systems and computer program products described herein.

In some examples, when the user 20 connects with the system 100, e.g., logs into the system through a registered account, the system 100 can review the history of user interaction with the system that is saved in the user history database 52 of the registry 51. The user's 20 prior interactions and image retrievals to help determine the context of image retrievals for the user. Establishing context may include a user 20 entering into search text, search images, event themes for search images and sentiment suggestions.

Referring to FIG. 2, the system 100 may include an inquiry context designator 53 for receiving the inputs from the user 10 and using those inputs to determine the context, e.g., intent, for the image retrieval. The user 20 may employ the inquiry context designator 53 at block 2 of the method depicted in FIG. 1. For example, the user 20 may enter search text, search images, event themes for search images and sentiment suggestions into an artificial intelligence (AI) driven chatbot 54. The artificial intelligence (AI) driven chatbot 54 may be implemented in the inquiry context designator 53 of the system 100. The artificial intelligence (AI) driven chatbot 54 can be a software application that use artificial intelligence (AI) and natural language processing (NLP) to understand what a user 20 wants, and guides them to their desired outcome. In the present case, the artificial intelligence (AI) driven chatbot 54 can receive an inquiry from the user 20 including an identify for the people that the user 20 wishes to be within the images, and an upcoming event for which the images are sought, and the chatbot 54 can provide searches that result in image suitable for that person and event. In some embodiments, a chatbot 54 will include use existing conversation data (if available) to understand the type of questions people ask. The chatbot 54 can analyze correct answers to those questions through a 'training' period. The artificial intelligence (AI) driven chatbot 54 can use machine learning and natural language processing (NLP) to learn context.

The artificial intelligence (AI) driven chatbot 54 of the methods, systems and computer program produces of the present disclosure may incorporate artificial intelligence in retrieving electronic images that are accessible from the user's devices, e.g., devices having hardware memory, In some embodiments, at block 2 of the method depicted in FIG. 1, the user 20 can interact with the system 100 through the artificial intelligence (AI) driven chat bot 54 and the speech to text conversation bot 55 for providing his/her intent for an image collection through the artificial intelligence (AI) driven intent based system 100 for retrieving images. The speech to text conversation bot can transcribe the audio from the user 20 spoken into the user terminal 21, and the text conversation can be employed to provide search text and/or suggested sentiment that is used by the artificial intelligence (AI) driven intent based system 100 for retrieving images to retrieve a collection of images in response to the user's 20 inquiry. The speech to text conversation bot 55 may be implemented in the inquiry context designator 53 of the system 100 depicted in FIG. 2.

In some embodiments, the inquiry context designator 53 of the system 100 employs the chatbot 54 (and in some embodiments also the speech to text conversion bot 55) to receive inputs from the user by using natural language processing (NLP) to capture the main idea for image retrieval. Natural language processing (NLP) is a subfield of computer science, information engineering, and artificial intelligence concerned with the interactions between computers and human (natural) languages, in particular how to program computers to process and analyze large amounts of natural language data. Natural language processing frequently involve speech recognition, natural language understanding, and natural language generation.

The artificial intelligence (AI) chat bot 54 combines the user provided search criteria to create a primary pattern. The artificial intelligence (AI) chat bot 54 bot refers curated events listings and image matching patterns. The artificial intelligence (AI) chatbot 54 creates reference search patterns.

The artificial intelligence (AI) chatbot 54 can apply a method for understanding sentiment plus content of the intended use to create the pattern for the search criteria. For example, the artificial intelligence (AI) chatbot 54 may perform image selection based on themes, events, categories, and sentiment. In one example, the artificial intelligence (AI) chatbot 54 of the artificial intelligence (AI) driven intent based system 100 for retrieving images may be directed to a milestone event, such as a milestone birthday. In this example, the user 20 may enter the milestone event into the chatbot in response to a data entry field. The artificial intelligence (AI) chatbot 54 for the artificial intelligence (AI) driven intent based system 100 for retrieving images may retrieve images in response to an image type. For example, the user may request for images showing people that are happy. The artificial intelligence (AI) bot 54 for the artificial intelligence (AI) driven intent based system 100 for retrieving images may retrieve images in response to a content for the images. For example, the user may request for images including groups of people, friends, family photos with a person of prominence and combinations thereof. The artificial intelligence (AI) bot 54 for the artificial intelligence (AI) driven intent based system 100 for retrieving images may retrieve images in response to a reference area. For example, the user may request for images of pictures first shared on social networking applications, images shared between reference persons, images shared between different groups in social networking applications, and combinations thereof.

The artificial intelligence (AI) bot 54 for the artificial intelligence (AI) driven intent based system 100 for retrieving images may retrieve images with variation and variety for auto selection based on different occasions, different locations, different times and combinations thereof. The artificial intelligence (AI) bot 54 for the artificial intelligence (AI) driven intent based system 100 for retrieving images may retrieve images from similar events on same dates from a selected year.

The start of these inquiries begins with the user 20 entering this information to direct the image retrieval at block 2. As noted above, the system 100 can cross reference prior searches in deciding the appropriate search strategy at block 3 of the method depicted in FIG. 1.

Referring to FIG. 1, the method may continue to block 4, which can include the system 100 accessing all stored image locations 21 for the user 20 and down selects images containing the lead protagonist. The lead protagonist is the person having the identity provided to the system by the user 20. As noted above, the lead protagonist may be the user 20, or a person other than the user 20. The stored image locations 21 for the user 20 can include the memory of mobile phones 22, cloud storage 23, SD cards 25, and messaging applications 24 that lets users text, chat, and share media, including voice messages and video, with individuals or groups. Referring to FIG. 2, the artificial intelligence (AI) driven intent based system 100 for retrieving images includes a user device interface 56 which may include a transceiver/internet connection for connecting to the user devices 21 having electronic images potentially stored thereon.

In some embodiments, the system 100 determines whether the user, e.g., the lead protagonist, is present in the images, e.g., photos, at block 5 of the method depicted in FIG. 1. In some embodiments, each of the photos received from the user's storage devices 21 may be checked for the presence of the user 20. In other embodiments, each of the each of the photos received from the user's storage devices 21 may be checked for the presence of an identity of a person that was previously provided to the system by the user 20 at block 2 of the method depicted in FIG. 1.

To check that the lead protagonist, e.g., user 20 or person identified by the user 20, is present in the images, the system 100 may employ machine image recognition methods, such as facial recognition. The system 100 may include an image recognition engine 57 that includes a facial recognition system 58.

The image recognition engine 57 may employ artificial intelligence utilizing computer software programs that analyze the images in order to recognize patterns, e.g., patterns associated with humans and/or objects. The artificial intelligence program functions for image recognition may include a series of algorithms, or mathematical procedures, which work like a flow-chart or series of questions to compare the objects in the users images with hundreds of thousands of stored reference images of objects in different angles, positions and movements. This type of artificial intelligence is known as "rule-based".

A facial recognition system 58 is a technology capable of identifying or verifying a person from a digital image or a video frame from a video source. There are multiple methods in which facial recognition systems work, but in general, they work by comparing selected facial features from given image with faces within a database. It is also described as a Biometric Artificial Intelligence based application that can uniquely identify a person by analyzing patterns based on the person's facial textures and shape.

Referring to block 6 of the method depicted in FIG. 1, in some embodiments, the retrieved images from the user's storage devices 21, which may have been confirmed for containing an image of the user 20, can be checked for duplicates. Also at block 7, the images can be checked to ensure that the images are clear. Images that are not clear are referred to as being blurry. Duplicate images and images that are not clear (blurry images) are removed at block 7. In some embodiments, the step at block 7 of the method depicted in FIG. 1 may be executed by the image quality confirmation engine 59 of the system 100 that is depicted in FIG. 2. The image quality confirmation engine 59 begins with an image pack shortlist of all the images for the user across the different storage devices 21, and removes the duplicates and blurry images from the image pack to provide a deduplication of images in an image pack prepared for an intent based image selection at block 8 of FIG. 1.

Block 8 of FIG. 1 includes an intent based image selection is performed, which may be an event based image selection. In response to the inquiries received from the chatbot 53, the artificial engine performs a down selection with machine learning. For example, when the image selection is providing a collage of common electronic images, e.g., photographs, the process of automatic down-selection of images for the collage may be based on intent. The intent can be the reason why the collage is being formed, e.g., why the images are being retrieved. For example, the intent can be to provide a collage of a person for an upcoming birthday celebration. In this case, the system 100 may select all images of the person who is the subject of the birthday celebration, and the images selected may be of things that the person did on their previous birthdays.

Starting vectors for common collage types and the process of automatic down-selection of images for the collage based on intent can include sample events. Sample events can include personal milestones, e.g., a special date, a birthday, an anniversary for an event, an accomplishment, such as graduation from an educational or training institution. Sample events can also include official milestones, such as work anniversaries, new jobs, promotions, etc. Sample events can also include a family event, such as the birth of a baby or a marriage ceremony. These events and dates provide necessary inputs for each vector definition. (e.g. pictures from past years that correspond to the milestone day or place or event etc.)

Block 8 of the method depicted in FIG. 1 may include invoking an algorithm for retrieving images in response to the user inquiries that were entered at block 2. In one example, a sample vector for a personal milestone image, e.g., collage, retrieval may include each image being auto-assigned a number, and a word cloud of the top auto-tags along with the image number is produced. A "word cloud" is selection of words used in a particular text or subject, in which each of the word in the could have some measurement indicating its frequency or importance. The system 100 using the algorithm and searching all of the user's storage devices can prepare a selection of images, e.g., 10-15 images, for a collage delivered to the user 20.

A number of sample vectors may be used as the algorithm for the artificial intelligence (AI) driven chatbot 54 to retrieve collections of images for collages. One sample vector can be for an image type depicting an emotion, such as happiness. The expected content produce by this retrieval can by electronic images indicating happiness of those being depicted in the images. The indicators for happiness can be images including smiling faces, images including bright lights, images of people outdoors, images of people looking at the camera, images of party objects, such as balloons and cake, images of animals, and food, as well as images of other objects that could be illustrative of a happy sentiment. Auto-tags for the images for a happy image type may include happy, smile, smiling, group, people, friendly, friends and combinations thereof. The correlation of the identified image to the image characteristics may be a sum of tag certainty across these characteristic tags to be higher than 90%.

Another sample vector could be for an image categorization for people. For example, the expected content produced by this retrieval can include electronic images of people. The indicators in the images of people within the image can include the number of faces being depicted in an electronic image, profile of faces in an image, and whether the people in the image are facing the camera. Typical auto-tags based on image analytics for wave form fitment validation can include an event, or a party, people, or people profiles. Tagging accuracy may be greater than 90%.

Another sample vector could be for an image content illustrating activity. For example, the expected content produced by this retrieval can include electronic images of activity. The indicators in the images of people within the image can include performing the activity. In one example, the activity could be the consumption of food, or wearing a clothes article, such as a hat. One example, of the activity can be sitting at a table. The activity may be a sport. Typical auto-tags based on image analytics for wave form fitment validation can include running, marathon, sport, play, basketball, football, exercise, running, action, swimming, surfing, sleeping and combinations thereof. Tagging accuracy may be greater than 60%.

Another sample vector could be for an image content for a location. The indicators in the images for locations can include beaches, waves, gardens, monuments etc. Typical auto-tags based on image analytics for wave form fitment validation of image retrieval based on location can include monument, tourism, travel, landmark, famous and combinations thereof.

Another sample vector could be for image content for different occasions. The indicator in the images for different occasions could be a wedding dress, balloons, couples, glasses toasting, solemn faces, bright clothes, etc. Typical auto-tags based on image analytics for wave form fitment validation of image retrieval based on an occasion can include wedding, marriage, ceremony, event or a combination thereof.

Another sample vector could be by timeline, e.g., image date time. The sample vector could be by date distribution. For example, the image date for retrieval can match a birthday, anniversary or any other date milestone.

For the intent based image selection at block 8 of FIG. 1, the method may continue to the system translating the inputs through the natural language processing (NLP) to identify context and defines standard criteria that is also based on previous experiences from other users 20 with similar intent. The context may include at least one of motivation, geoposition, celebration, customs and combinations thereof. The standard criteria may be defined using the algorithms/vectors described above with reference to block 4.

The event based selection at block 8 of FIG. 1 may further include the system 100 searching the available sources, e.g., the different locations 21, e.g., phones, cloud storage, social media applications, that are associated with the user 20. The system 100 employs as much content and tools as possible, e.g., associated tags and text, image scan, etc., and selects a set of images that matches the search criteria. In some embodiments, the user 20, e.g., main protagonist, is in the images.

In some examples, the system 100 may employ an auto-tagging operation at block 9 of FIG. 1, in which the auto tagging operation is across the down selected images across the main vectors that have been defined. In some embodiments, image auto tagging technology enables automatic assignment of relevant tags or keywords to the images retrieved by the initial search, Referring to FIG. 2, the artificial intelligence (AI) driven intent based system 100 for retrieving images may include an auto tagging tool 60 for providing the auto-tagging operation at block 9. The auto tagging tool 60 can analyze the pixel content of visuals, extracts their features and detects objects of interest, In some examples, the auto tagging tool 60 is trained with more than 3000 objects from daily life and can be additionally trained with customer-specific tags for precision.

Referring to block 10 of FIG. 1, each image is assigned a number, and the auto-tags with an accuracy ranking is stored. For each image the top tags are ranked and given a weight-age and a score is auto-assigned. The assignment of the numbers and ranking of the images at block 10 can be provided by the auto-tagging tool 60. The auto-tagging tool 60 also provides for selection of the images having the top tags, i.e., the most common tags being used to identify content in the retrieved images. The outliers, e.g., the images not including the top tags, may then be removed at block 11 of FIG. 1.

Referring to block 12, the method depicted in FIG. 1 may further include down selection of images across different vectors. The vectors are different algorithms for selecting images, as described above with reference to block 8. For example, images may be selected that meet two criteria for the intent in which they were selected. The two criteria resulting from one or more vectors. For example, crossed vectors may provide images of an identified person, at a specific time and date doing a particular activity. These crossed vectors are likely suitable for the intent of the image retrieval, e.g., collage. The comparison of the cross vectors may be provided by the artificial intelligence drive chatbot 54.

Referring to block 13 of FIG. 1, the artificial intelligence (AI) driven intent based system 100 for retrieving images uses a word cloud ranking to identify the top words and sentiments and images that are repeated across those top words and sentiments are further shortlisted as images fits the image purpose. In some embodiments, the system select the images inside the established range that can be adjusted for accuracy improvements. The new set of images may then be further ranked.

Figure 4:
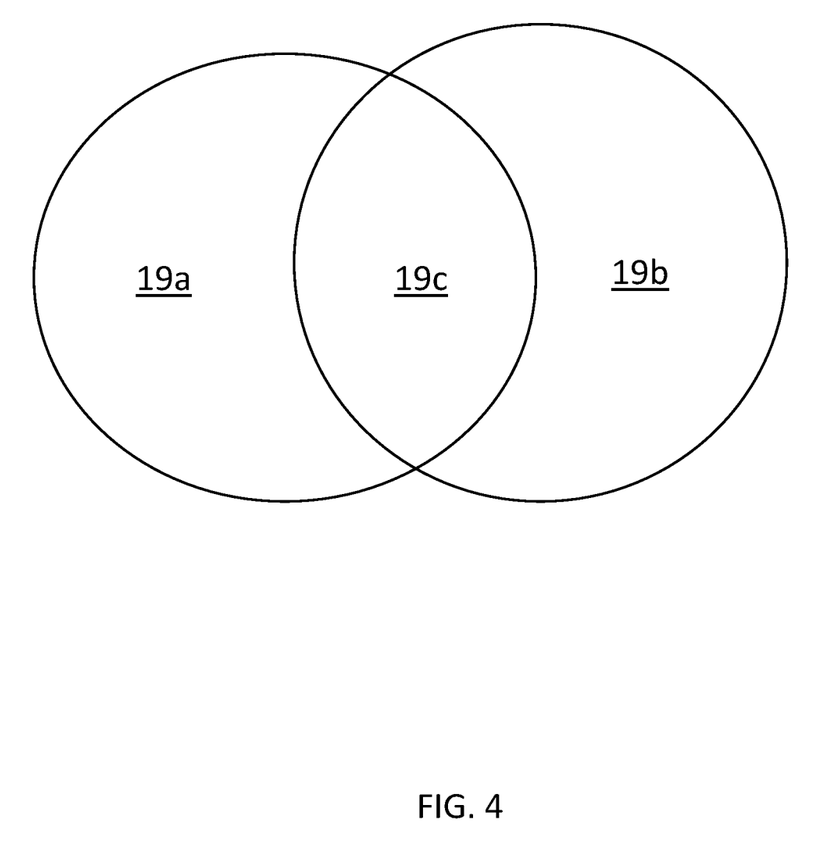
FIG. 4 is an illustration of one embodiment of a Venn diagram illustrating overlap between two different criteria for retrieving electronic images, in which the images characterized by the overlap in content are the images retrieved for use in a collage.

At block 14, the image-words (from autotags) for the top words in the word cloud are plotted as a Venn diagram. FIG. 4 illustrates one embodiment of a Venn diagram. FIG. 4 illustrates a first set of top words from the word cloud as the circle having reference number 19a, a second set of top words from the word cloud as the circle having reference number 19b, wherein the common area is indicated by reference number 19C. The images associated with the common area in the Venn diagram are selected for the collage.

Referring to FIGS. 1-3, the system 100 presents the outcome 500, e.g., printed documents including a collage of images, to the user 20 who can play with the extracted images to create the image collage, or refine the image selection by restarting a new cycle of search from step 1. For example at block 17, the images, sentiments, and word cloud pairs are isolated. At block 18,the collage pack is provided to the user 20. The collage pack may include a plurality of like electronic images provided to the user 20 by the system 100 as the outcome 500. Referring to FIG. 2, the system includes an output module 62 for providing a report format of the collage that can be printed for viewing by the user 20.

The methods and systems depicted in FIGS. 1-3 combines image searches based on a combination of tagging, predefined categorization and labeling in addition to applying artificial intelligence (AI) to aid in identifying images that are fit-for-purpose or match the intent. The methods and systems depicted in FIGS. 1-3 also apply machine learning (ML) for context by distinguishing between smiling vs. frowning in the image processing and analyzing associated environment and texts. As an example, the methods and systems described herein can rapidly pick out pictures stored on a phone, or exchanged on social media applications, that contain images of a friend. The criteria for image retrieval can be that the friend is smiling, or is in the center of a group picture, with common friends and family. Based on the event or/definition, the construct or type of images that 'fit' the purpose and will be selected and rapidly retrieved. The solution can also take in specific recommendations of images (such as red dress, cutting cake, at location and so on) to be included as feeders to the retrieval process. Note that the text around the picture can be utilized as well, which is a huge differentiator from existing cloud-based photo sentiment analytics.

Since the methods and systems depicted in FIGS. 1-3 understand the sentiment or need for the images and learns based on the users down selection, collages or images can be easily created. The methods and systems described herein not just match or leverage image recognition techniques, but is able to match user's sentiment with the sentiment in the pictures to create custom images and collages.

In the methods and systems of the present disclosure, user sentiment and words are used as search criteria. Vectors based on image characteristics are extended automatically with rules around date/event/ activity/emotion to provide the range of images from all data sources. Auto-tagged images are reviewed and tags isolated based on the sentiments and words from the user (search criteria). Word cloud are created from the associated auto-tags. In some embodiments, image-tag pairs are created for all words. In some embodiments, image-words (from autotags) for the top words in the cloud are plotted as a Venn diagram. Images in the common area are selected for the collage.

The methods, systems and computer program products of the present disclosure provide a rapid creation of a collage from a voiced sentiment. In some embodiments, the images are tagged with different sentiments.

Selecting top sentiments from the cloud and then using that to scan through all images and identify a subset will ensure that there is a diverse range of pictures selected for the collage.

In another aspect, a system 100 is provided for retrieving electronic images 500. In one embodiment, the system includes a first interface for retrieving a plurality of electronic images includes obtaining images from a plurality of electronic storage sites. An image recognition engine for selecting a first set of images containing a main protagonist from the plurality of electronic images. An artificial intelligence chatbot performs an intent based image selection from the first set of images. The intent based image selection includes tagging the first set of images with word tags identifying content of the images, creating a word cloud from the word tags, plotting the top word tags from the word cloud in a Venn diagram, and extracting images from the overlapping are of the Venn diagram. The system further includes a report generator for producing a collage 500 of intent based images correlated to the main protagonist from the extracted images. The artificial intelligence chatbot 54 may include a hardware processor 66 configured for performing the above described steps for the intent based image selection. The bus 102 interconnects the plurality of components in the system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.). In some embodiments, the hardware processor subsystem can include and execute one or more software elements. The one or more software elements can include an operating system and/or one or more applications and/or specific code to achieve a specified result. In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs. These and other variations of a hardware processor subsystem are also contemplated in accordance with embodiments of the present invention.

Figure 5:
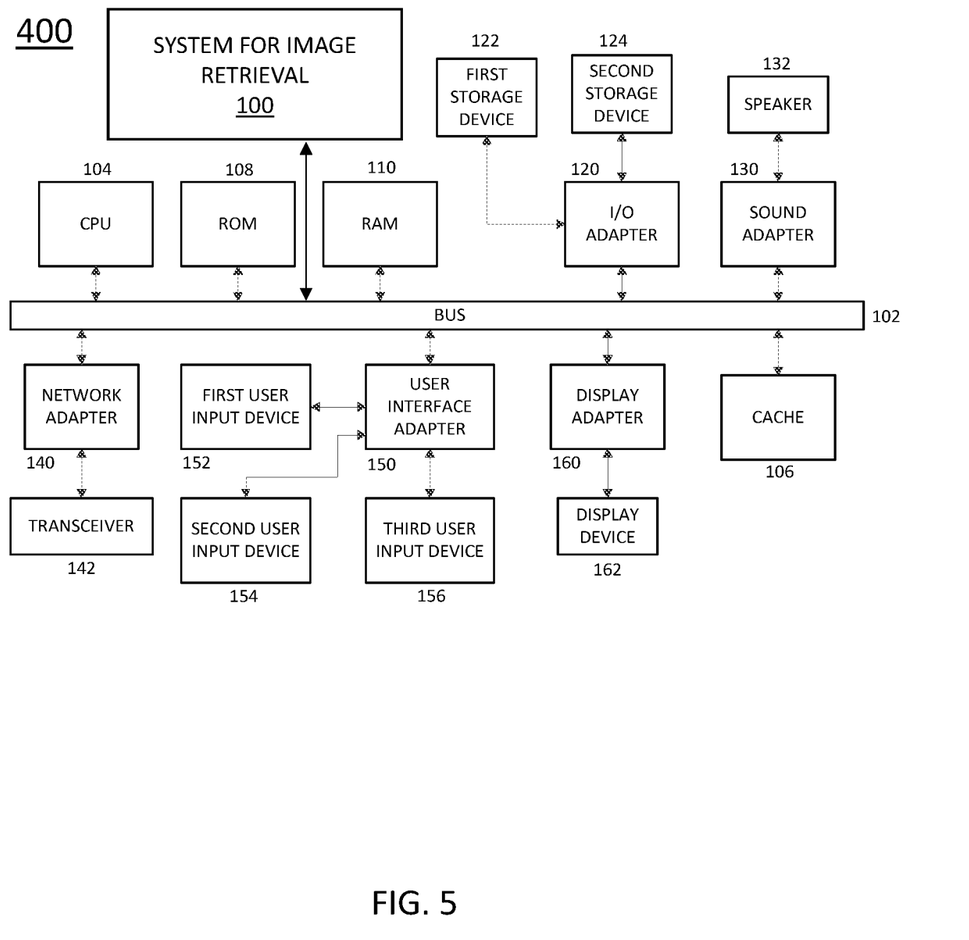
FIG. 5 is a block diagram illustrating a processing system that can incorporate the system for image retrieval that is depicted in FIG. 2, in accordance with one embodiment of the present disclosure.

Additionally, the system 100 that is depicted in FIG. 2 may be integrated into the processing system 400 depicted in FIG. 5. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product that includes a non-transitory computer readable storage medium having computer readable program code embodied therein for a method for retrieving a plurality of electronic images comprising a computer readable storage medium having computer readable program code embodied therewith, the program instructions executable by a processor to cause the processor to obtain, using the processor, images from a plurality of electronic storage sites; and select, using the processor, a first set of images containing a main protagonist from the plurality of electronic images. The method further includes performing, using the processor, an intent based image selection from the first set of images, the intent based image selection comprising tagging the first set of images with word tags identifying content of the images, creating a word cloud from the word tags, plotting the top word tags from the word cloud in a Venn diagram, and extracting images from the overlapping are of the Venn diagram, wherein the extracted images provide a collage of intent based images correlated to the main protagonist.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings:

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
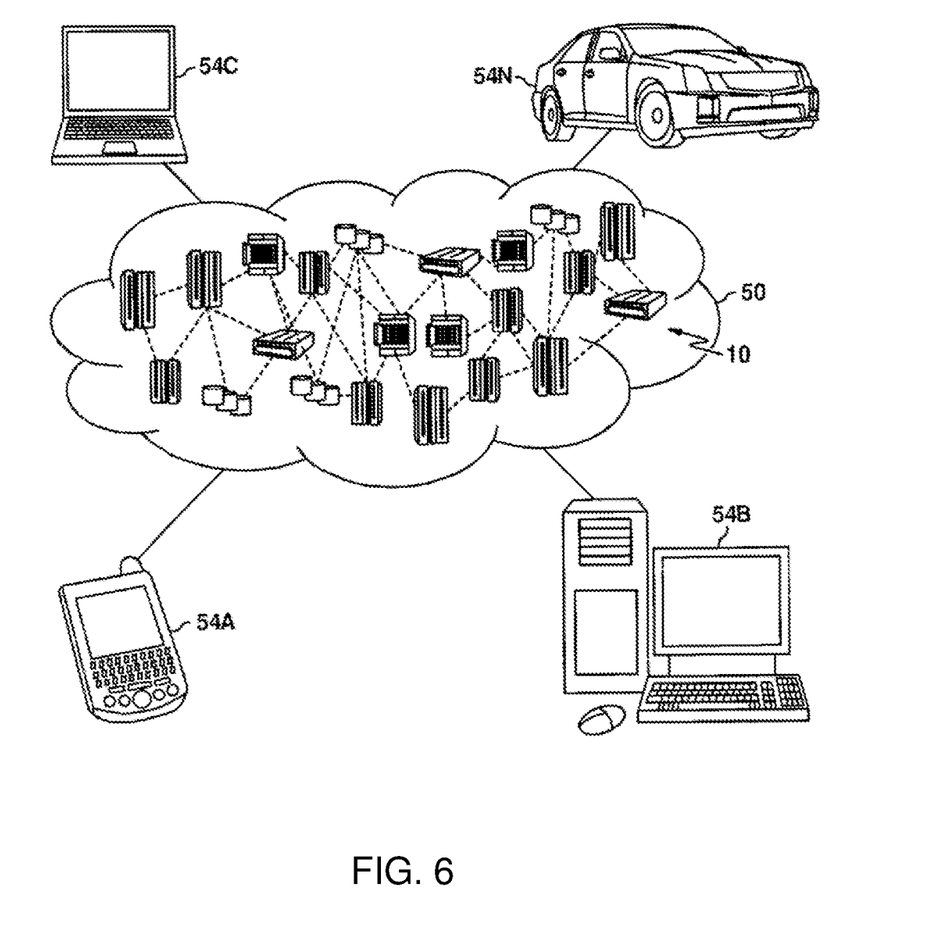
FIG. 6 depicts a cloud computing environment according to an embodiment of the present disclosure.

Referring now to FIG. 12, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 51 and cloud computing environment 50 can communicate with any type of computerized device over any type of network and/or network addressable connection (e.g., using a web browser).

Figure 7:
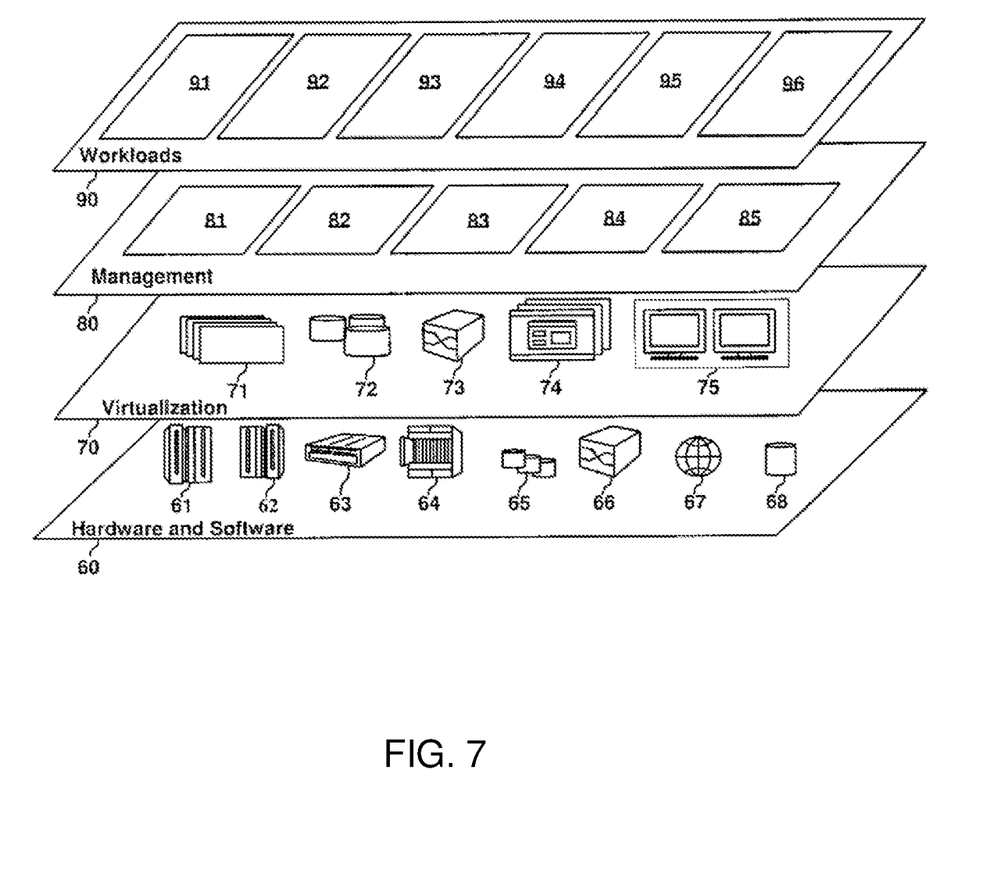
FIG. 7 depicts abstraction model layers according to an embodiment of the present disclosure.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application 96 for retrieving electronic images using the artificial intelligence (AI) driven intent based system 100, which is described with reference to FIGS. 1-6.

Having described preferred embodiments of an artificial intelligence driven image retrieval (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for retrieving a plurality of electronic images comprising:
   obtaining images from a plurality of electronic storage sites;
   selecting a first set of images containing a main protagonist from the plurality of electronic images; and
   performing an intent based image selection from the first set of images, the intent based image selection comprising tagging the first set of images with word tags identifying content of the images, creating a word cloud from the word tags plotting the top word tags from the word cloud in a Venn diagram, and extracting images from the overlapping are of the Venn diagram, wherein the extracted images provide a collage of intent based images correlated to the main protagonist.

2. The computer implemented method of claim 1, wherein said intent based image selection further comprises using wave form fitment validation.

3. The computer implemented method of claim 1, wherein said creating the word cloud further comprises auto-tagging of the first set of images.

4. The computer implemented method of claim 1, wherein the electronic storage sites includes the memory of a camera including device, an internet based networking application, or a combination thereof.

5. The computer implemented method of claim 1, wherein the main protagonist comprises an identity of a person other than a user of the electronic storage sites.

6. The computer implemented method of claim 1, wherein the main protagonist comprises an identity of a user of the electronic storage sites.

7. The computer implemented method of claim 1, wherein said intent for the intent based image selection is that the collage is for an event.

8. The computer implemented method of claim 1, wherein the event is selected from the group consisting of a party, a wedding, a marriage, a ceremony, a birth, a celebration, a graduation and combinations thereof.

9. The computer implemented method of claim 1, wherein the word tags are selected from the group consisting of word tags identifying facial expressions, word tags identifying people, word tags identifying activity, word tags identifying location where an image was taken, word tags identifying an occasion, word tags identifying a date and combinations thereof.

10. A system for retrieving electronic images comprising:
    an interface for retrieving a plurality of electronic images includes obtaining images from a plurality of electronic storage sites;
    an image recognition engine for selecting a first set of images containing a main protagonist from the plurality of electronic images;
    an artificial intelligence chatbot performs an intent based image selection from the first set of images, wherein the intent based image selection includes tagging the first set of images with word tags identifying content of the images creating a word cloud from the word tags, plotting the top word tags from the word cloud in a Venn diagram, and extracting images from the overlapping are of the Venn diagram; and
    a report generator for producing a collage of intent based images correlated to the main protagonist from the extracted images.

11. The system of claim 10, wherein said intent based image selection further comprises using wave form fitment validation.

12. The system of claim 10, wherein said creating the word cloud further comprises auto-tagging of the first set of images.

13. The system of claim 10, wherein the electronic storage sites includes the memory of a camera including device.

14. The system of claim 10, wherein the electronic storage sites includes an internet based networking application.

15. The system of claim 10, wherein the main protagonist comprises an identity of a person other than a user of the electronic storage sites.

16. The system of claim 10, wherein the main protagonist comprises an identity of a user of the electronic storage sites.

17. The system of claim 10, wherein said intent for the intent based image selection is that the collage is for an event.

18. A computer program product for retrieving a plurality of electronic images comprising a computer readable storage medium having computer readable program code embodied therewith, the program instructions executable by a processor to cause the processor to:
    obtain, using the processor, images from a plurality of electronic storage sites;
    select, using the processor, a first set of images containing a main protagonist from the plurality of electronic images; and
    perform, using the processor, an intent based image selection from the first set of images, the intent based image selection comprising tagging the first set of images with word tags identifying content of the images, creating a word cloud from the word tags, plotting the top word tags from the word cloud in a Venn diagram, and extracting images from the overlapping are of the Venn diagram, wherein the extracted images provide a collage of intent based images correlated to the main protagonist.

19. The computer program product of claim 18, wherein said intent based image selection further comprises using wave form fitment validation.

20. The computer program product of claim 18, wherein said creating the word cloud further comprises auto-tagging of the first set of images.

* * * * *